May 22, 1956
W. D. MOUNCE
2,746,551
METHOD OF INCREASING PERMEABILITY
OF A PRODUCING FORMATION
Filed April 30, 1952
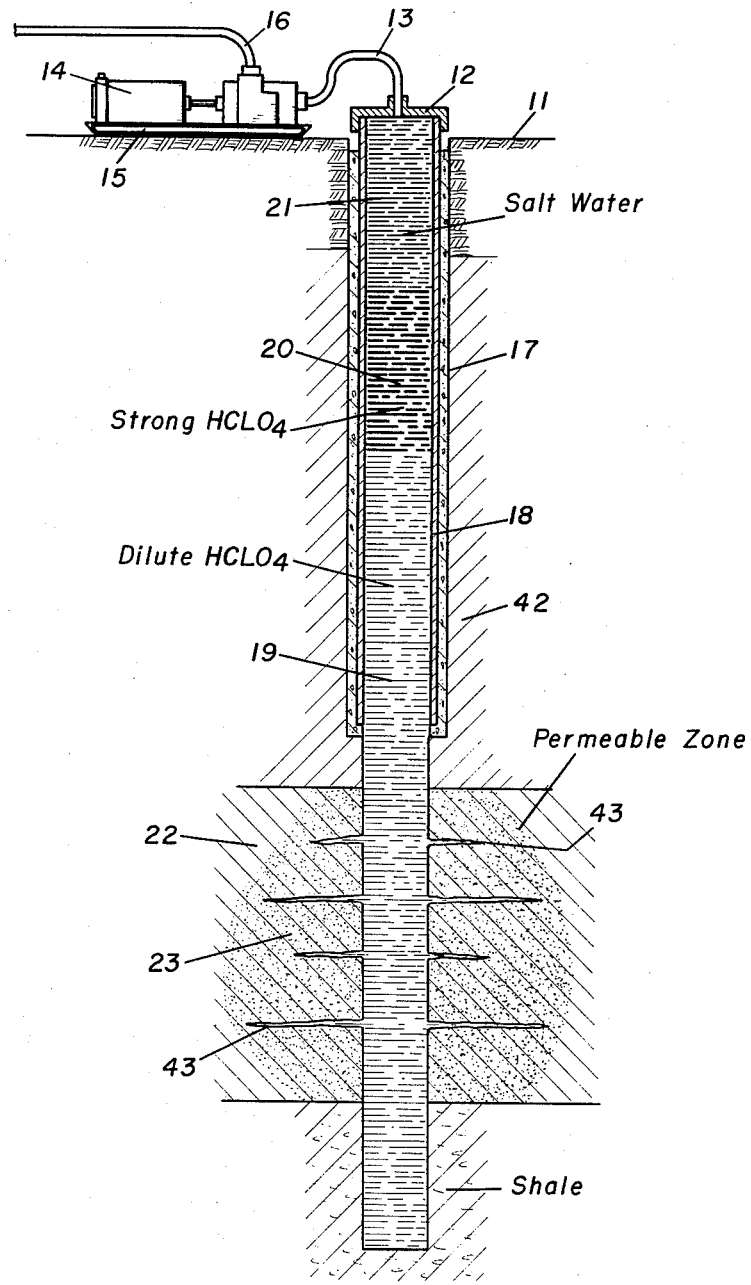
INVENTOR.
Whitman D. Mounce,
BY
AGENT.

United States Patent Office 2,746,551
Patented May 22, 1956

2,746,551

METHOD OF INCREASING PERMEABILITY OF A PRODUCING FORMATION

Whitman D. Mounce, Houston, Tex., assignor, by mesne assignments, to Esso Research and Engineering Company, Elizabeth, N. J., a corporation of Delaware Application April 30, 1952, Serial No. 285,221

3 Claims. (Cl. 166—36)

The present invention is directed to a method of increasing the permeability of a producing formation. More particularly, the invention is directed to a method of increasing the permeability of a producing formation containing petroliferous substances.

The present invention may be briefly described as involving a method of increasing the permeability of a producing formation which comprises introducing into the producing formation a fluid explosive such as an oxidizing agent which will react with organic matter in the formation. Following the explosion, the permeability of the formation having been increased thereby, it is possible to produce desirable fluids from said formation. For example, if petroliferous substances are contained in the formation in which the explosion takes place, the petroliferous substances may then be produced therefrom.

The explosive employed in the practice of the present invention is an oxidizing agent, such as a perhalogen acid, as exemplified by perchloric acid, per-iodic acid, perfluoric acid and perbromic acid. Perchloric acid will be preferred of the perhalogen acids.

The oxidizing agent, such as perhalogen acid, is pumped down into the well bore and forced into the formation. By employing perhalogen acid of the proper strength an explosive reaction takes place in the formation on contact with hydrocarbons contained therein. Control of the explosion may be maintained by injecting into the producing formation a dilute solution of a perhalogen acid to provide in the formation a sufficient volume of the perhalogen acid. Thereafter a strong solution of perhalogen acid containing, if desired, a catalyst for the reaction may then be forced into the formation whereby an explosion takes place since the temperature of the formation is such that with strong perhalogen acid a violent explosion is effected.

The perhalogen acid may be introduced directly into the formation containing petroliferous substances and exploded by contact therewith or it may be introduced into the formation and followed by a stronger acid or by a body of an organic substance such as petroleum, alcohol, hydrocarbons, ketones, and the like, to cause an explosion provided the formation does not contain organic matter to contact the perhalogen acid. In the latter cases the stronger acid and the organic matter serve to detonate the perhalogen acid in the formation.

When acids of varying strengths are employed as aqueous solution, the perhalogen acid may vary in strength from about 50% to 100% perhalogen acid. The dilute perhalogen acid may range in strength from about 50% to about 75% perhalogen acid while the stronger acids may range from about 80% to 100% perhalogen acid, depending upon the prevailing temperature of the producing formation. For example, a perchloric acid solution of 72% $HClO_4$ has been detonated after admixture with a sand body containing crude petroleum and having a temperature sufficient to initiate the reaction by injecting therein an aqueous solution of perchloric acid of 85% $HClO_4$. Catalysts may be employed in solution in the perhalogen acid such as ceric ammonium nitrate, ammonium vanadate, and osmium tetraoxide, and the like.

By detonating a perhalogen acid in a producing formation, it is possible to increase the permeability thereof by causing fractures to appear in the formation extending from the well bore back into the formation which allows the petroliferous substances or hydrocarbons in the formation to flow more easily to the well bore than when the well is drilled and to allow production of the same. Another effect is obtained by employing a perhalogen acid, such as perchloric acid, in addition to the fracturing of the formation. Besides increasing the permeability of the formation by fracturing same perchloric acid results in the hydrocarbons in contact therewith being substantially completely oxidized leaving the formation in a clean condition and allows the petroliferous substances back from the scene of the explosion to flow readily to the wellbore. Actually sand admixed with crude petroleum having perchloric acid introduced therein and exploded results in the sand being cleaned entirely of the petroliferous substances contained in the sand.

The invention will be further illustrated by reference to the drawing in which the single figure is an illustration of a preferred mode of applying the invention.

Referring now to the drawing and particularly to the single figure in the drawing, numeral 11 designates an area adjacent the wellhead 12. The wellhead 12 is connected by a pipe 13 to a pump 14 which is arranged on a suitable support 15 and which may be portable. The pump 14 has a pipe 16 connected thereto and to a source of fluid, such as salt water and the like. The wellhead 12 closes the wellbore 17 in which is arranged a cemented casing 18. A body of dilute perhalogen acid 19 has previously been arranged in the well bore 17 such as by pumping same into the well bore 17 or by a dump bailer. It may be desirable to employ a dump bailer because of the corrosive nature of the perhalogen acid. Arranged above the dilute perhalogen acid is a body 20 of strong perhalogen acid which may similarly be introduced into the wellbore 17. Pressure is then put on the wellbore 17 by starting the pump 14 which causes salt water 21 to follow the strong perhalogen acid down the wellbore. As a result the dilute perhalogen acid is pumped out into a permeable formation 22 from which it is desired to produce oil. The perhalogen acid is forced out into the formation 22 and flows away from the well into a zone 23 as shown in the drawing. When the strong perhalogen acid which may contain a catalyst reaches the permeable formation 22 it is also forced out into the zone 23 and admixes with the perhalogen acid in the zone 23. Since the permeable zone 22 contains hydrocarbons and since temperatures in the producing formation may range as high as 300° F. an explosive reaction takes place. The perhalogen acid and the petroliferous substances react violently to cause consumption of the petroliferous substances to clean the formation adjacent the wellbore 17 and to fracture the formation 22 increasing the permeability thereof. Thereafter the petroliferous substances in the permeable zone 22 will flow readily to the wellbore 17 and the well may be placed on production in a conventional manner.

One of the desirable features of the present invention is that the presence of water in the formation 22 does not interfere with the explosive reaction. For example, the perhalogen acids will react violently with petroliferous substances on contact therewith but do not react with water which allows the reaction to form fractures 43 in the zone 22 as shown in Fig. 1.

As pointed out before, the perhalogen acid, such as perchloric acid, not only fractures the formation but the formation may actually be cleaned by the substantially complete consumption of the hydrocarbon by the violent oxidizing reaction which takes place.

It is to be understood that the terminology "fluid explosive" employed in the specification and claims is intended to embrace the perhalogen acids and other oxidizing agents which will react violently with organic matter. The dilute perhalogen acid on introduction into the formation serves as the explosive and the stronger perhalogen acid as the detonating agent on admixture with organic matter in the formation. Actually perhalogen acid per se is not an explosive but upon contact with petroliferous substances the perhalogen acid of a proper strength will explode. The use of perhalogen acid in a dilute condition followed by a stronger acid is not attended with hazards since the perhalogen acids react or explode violently only when admixed with organic substances.

The nature and objects of the present invention having been completely described and illustrated, what I wish to claim as new and useful and to secure by Letters Patent is:

1. A method of increasing the permeability of a producing formation containing petroliferous substances which comprises forcing a dilute solution of perchloric acid of insufficient strength to explode at the prevailing temperature of the producing formation into said producing formation and then forcing a stronger solution of perchloric acid of a sufficient strength into said formation to initiate an explosion in said formation at prevailing temperature of the producing formation to clean and fracture said formation, and then producing petroliferous substances from said formation.

2. A method of increasing the permeability of a producing formation containing petroliferous substances which comprises forcing a dilute solution of perchloric acid of insufficient strength to explode at the prevailing temperature of the producing formation into said producing formation and then forcing a stronger solution of perchloric acid containing ceric ammonium nitrate into said formation, said stronger solution of perchloric acid being of sufficient strength to initiate an explosion in said formation at prevailing temperature of the producing formation to clean and fracture said formation and then producing petroliferous substances from said formation.

3. A method of increasing the permeability of a producing formation which comprises forcing an aqueous solution of perchloric acid having a strength ranging from about 50% to about 70% $HClO_4$ into a producing formation containing petroliferous substances, forcing an aqueous solution of perchloric acid having a strength ranging from about 80% to about 100% $HClO_4$ into said formation to explode the perchloric acid and petroliferous substance in said formation to clean and fraction said formation and then producing petroliferous substances from said formation, the actual strengths of said solutions being selected in view of the prevailing temperature of the producing formation.

References Cited in the file of this patent

UNITED STATES PATENTS

| | | |
|---|---|---|
| 1,248,689 | McAvoy | Dec. 4, 1917 |
| 2,316,596 | Kennedy | Apr. 13, 1943 |
| 2,504,119 | Frazer et al. | Apr. 18, 1950 |

OTHER REFERENCES

U. S. Bureau of Mines, Report of Investigation No. 4169 (1948), 17 pages.